United States Patent [19]
Asnis et al.

[11] 3,838,246
[45] Sept. 24, 1974

[54] FLUX-CORED ELECTRODE

[76] Inventors: Arkady Efimovich Asnis, Bulvar Lesi Ukrainki, 2, kv. 5; Yury Yakovelevich Gretsky, ulitsa Semashko, 21, kv. 116; Vladislav Alexandrovich Metlitsky, ulitsa Khorevaya, 31, kv. 6, all of Kiev, U.S.S.R.

[22] Filed: Sept. 8, 1972

[21] Appl. No.: 287,360

[52] U.S. Cl. .................................. 219/146, 148/24
[51] Int. Cl. ............................................ B23k 35/22
[58] Field of Search ............ 219/146, 145, 137, 74; 117/202–207; 148/24, 26

[56] References Cited
UNITED STATES PATENTS

| | | | |
|---|---|---|---|
| 2,900,490 | 8/1959 | Petryck et al. | 219/146 |
| 3,177,340 | 4/1965 | Danhien | 219/146 |
| 3,253,950 | 5/1966 | Wasserman et al. | 117/207 |
| 3,398,256 | 8/1968 | Foley, Jr. | 219/146 |

FOREIGN PATENTS OR APPLICATIONS

| | | | |
|---|---|---|---|
| 271,750 | 6/1966 | Australia | 219/146 |
| 1,040,927 | 9/1966 | Great Britain | 219/146 |

*Primary Examiner*—J. V. Truhe
*Assistant Examiner*—Clifford C. Shaw
*Attorney, Agent, or Firm*—Eric H. Waters

[57] ABSTRACT

A flux-cored electrode for welding and surfacing cast iron, with a steel casing filled with a pulverized charge or mixture amounting to 65–80 percent by weight of total electrode weight of the following composition (percent by weight of the total electrode weight):

| | |
|---|---|
| graphite | 5–12 |
| ferrosilicon | 0.1–6.0 |
| iron powder | 0.01–20.00 |
| complex modifier | 0.5–6.0 |
| flux-forming agent | 0.1–3.0 |

2 Claims, No Drawings

FLUX-CORED ELECTRODE

The present invention relates to electrode materials for electric arc welding and more particularly to flux-cored electrodes for welding and surfacing cast iron.

Most efficiently this invention can be utilized for welding and surfacing high strength cast iron with nodular graphite.

Known in the prior art are flux-cored electrodes for welding and surfacing cast iron with steel casings amounting to 70–80 percent by weight of the total weight of the electrode and incorporating a pulverized charge or mixture of the following composition; percent by weight:

| | |
|---|---|
| graphite | 5.8–7.5 |
| ferrosilicon | 3.7–6.0 |
| iron powder | 0.01–20.00 | with the following additions:

| | |
|---|---|
| ferromanganese | 0.5–1.3 |
| ferrotitanium | 1.45–3.00 |
| aluminum powder | 0.4–2.5 |

The above additions serve to increase the degree of graphitization, fluidity (aluminum powder), crumbling of graphite inclusion, strength properties of deposited metal (ferromanganese and ferrotitanium) (Author's Certificate of the USSR N 163687 of July 22, 1964, Cl. 21h, 30/16).

The known flux-cored electrodes ensure the production of weld or deposited metal which consists of grey iron with flake graphite of a specified chemical composition and hardness number.

The foregoing conventional flux-cored electrodes are applicable for the welding and surfacing of heavy cast iron pieces of flake graphite which shall meet requirements to the strength of the welded joints at the level of grey iron strength.

The known flux-cored electrodes are unsuitable for welding high strength cast iron as the presence of flake graphite in deposited iron results in comparatively low strength and plastic properties of the deposited metal, welded joints do not conform to the requirements with respect to uniformity of structure and to full strength that are of particular importance in welding and surfacing high strength cast iron with nodular graphite.

It is an object of this invention to eliminate the above disadvantages.

An essential object of the present invention is to provide a flux-cored electrode for the welding and surfacing of a high-strength cast iron with nodular graphite, making it possible to obtain a weld joint having high physical and mechanical properties.

According to the specified object in the proposed flux-cored electrodes conforming to this invention a steel casing amounts to 65–80 percent by weight of the total weight of the electrode and a pulverized charge, apart from the aforesaid ingredients taken in the following amounts in per cent by weight of the total electrode weight:

| | |
|---|---|
| graphite | 5–12 |
| ferrosilicon | 0.1–6.0 |
| iron powder | 0.01–20.0 | contains, as an addition, a complex modifier amounting to 0.5–6.0 percent by weight of the total weight of the electrode (percent, by weight):

| | |
|---|---|
| magnesium | –1–12 |
| rare-earth metals | 0.1–10.0 |
| calcium | 8–22 |
| silicon | 50–65 |
| iron | 8–20 | in combination with a flux-forming agent amounting to 0.1–3 percent by weight of the total weight of the electrode.

It is common knowledge that graphitization of cast iron surfaced with a flux-cored electrode calls for a high percentage (12–15 percent by weight) of graphitizing ingredients: graphite and ferrosilicon.

We have established that with the graphite content in the flux-cored electrode exceeding 12 percent by weight, graphite is not assimilated by a welding bath and is separated out in the form of unfused mixture or kish. As for ferrosilicon, the flux-cored electrodes shall contain a maximum of 6 percent by weight of ferrosilicon since an excess of silicon due to a higher ferrosilicon percentage results in a reduced impact strength of the weld metal.

The complex modifier is an alloy produced by fusing together calcium-silicon, magnesium, ferrosilicon, iron and components containing rare-earth metals. The complex modifier amounting to less than 0.5 percent by weight does not ensure segregation of nodular graphite (graphite spheroidizing) in the weld metal, whereas the modifier contents exceeding 6 percent by weight adversely affect technological properties of the flux-cored electrodes (stability of the arcing process, spattering, etc.).

The flux-forming ingredient of the flux-cored electrodes is necessary as it tends to improve assimilation of the complex modifier, i.e., to reduce substantially the loss in burning of graphite-spheroidizing elements (magnesium, calcium, rare-earth metals), and also to ensure high technological properties of the flux-cored electrodes: stable arcing, adequate molding of the slag bath during crystallization of the deposited metal, deposits free from porosity, etc. Effectiveness of the flux-forming agent is displayed with its content exceeding 0.1 percent, though it should be not more than 3 percent by weight due to excessive slagging of the molten pool.

Halides of the alkaline-earth metals taken individually or in combination proved successful as the flux-forming agent.

We have found out that with a view to achieving the specified objects the most favorable conditions are created when using fluorspar as the flux-forming agent, amounting to 0.3–2.5 percent by weight and containing over 85 percent of calcium fluoride.

Comprehensive testing of the flux-cored electrode proposed herewith has shown that when welding and surfacing cast iron it ensures the production of reproducible results with respect to the requisite structure of high strength cast iron with nodular graphite and high physicomechanical properties, as well as all the requirements imposed on weld or deposit appearance.

To make the present invention more clear the following are exemplary embodiments.

EXAMPLE 1

The flux-cored electrode proposed for the welding and surfacing of cast iron comprises a steel casing or tube amounting to 78 percent of total electrode weight and filled with a charge whose ingredients are taken in the following weight ratios (percent of the total weight of the electrode):

| | |
|---|---|
| graphite | 6.0 |
| ferrosilicon | 5.5 |
| iron powder | 6.8 |
| complex modifier | 1.1 |
| flux-forming agent | 2.6 |
| with the complex modifier containing percent by weight: | |
| magnesium | 4.5 |
| rare-earth metals | 8.2 |
| calcium | 10.0 |
| silicon | 58.0 |
| iron | 19.3 |

The flux-forming agent consisted of 90 percent by weight of calcium fluoride and 10 percent by weight of admixtures.

Open-arc welding was effected with the said flux-cored electrode, 3.2 mm dia, with D.C., straight polarity. The following welding conditions were used:

| | |
|---|---|
| Electrode feed rate | 120 m/hr |
| Welding current | 410–460 A |
| Arc voltage | 26–30 V |

EXAMPLE 2

The proposed flux-cored electrode for welding and surfacing cast iron comprises a steel casing amounting to 68.0 percent by weight of the total weight of the electrode, filled with a pulverized charge with ingredients taken in the following weight ratios (percent by weight of the total electrode weight).

| | |
|---|---|
| graphite | 10.2 |
| ferrosilicon | 0.8 |
| iron powder | 15.0 |
| complex modifier | 5.7 |
| flux-forming agent | 0.3 |
| with the complex modifier containing, percent by weight: | |
| magnesium | 7.6 |
| rare-earth metals | 5.0 |
| calcium | 15.2 |
| silicon | 60.8 |
| iron | 11.4 |

The flux-forming agent consisted of 85 percent by weight of calcium fluoride, 9 percent by weight of boron chloride and 6 percent by weight of admixtures.

Open-arc welding was effected with the said flux-cored electrode 2.8 mm dia with D.C. straight polarity. The following welding conditions were used:

| | |
|---|---|
| Electrode feed rate | 132 m/hr |
| Welding current | 420–465 A |
| Arc voltage | 27–32 V |

EXAMPLE 3

The proposed flux-cored electrode for welding and surfacing cast iron comprises a steel casing amounting to 72.0 percent by weight of the total electrode weight and filled with a pulverized charge with ingredients taken in the following weight ratios (percent by weight of the total electrode weight):

| | |
|---|---|
| graphite | 8.0 |
| ferrosilicon | 3.0 |
| iron powder | 13.5 |
| complex modifier | 3.0 |
| flux-forming agent | 0.5 |
| with the complex modifier containing percent by weight: | |
| magnesium | 9.7 |
| rare-earth metals | 3.0 |
| calcium | 19.0 |
| silicon | 54.0 |
| iron | 14.3 |

The flux-forming agent contained 87 percent by weight of calcium fluoride, 2 percent by weight of boron chloride, 3 percent by weight calcium chloride and 8 percent by weight of admixtures.

Open-arc welding was effected with the said flux-cored electrode 3.0 mm dia with D.C. straight polarity. The following welding conditions were used:

| | |
|---|---|
| Electrode feed rate | 112 m/hr |
| Welding current | 400–450 A |
| Arc voltage | 25–28 V |

In all three examples cited above the deposited metal after heat treatment (annealing and holding at a temperature of 850°–900°C for 3 hours) is ferrite-perlite or ferrite cast iron with nodular graphite.

Deposited cast iron features flat surface free from pores and cracks with a smooth transition from the deposited to base metal and without undercuts.

Mechanical properties of the deposited metal after said heat treatment range within the following region:

| | |
|---|---|
| tensile strength | 45–52 kg/mm² |
| yield point in elongation | 35–42 kg/mm² |
| elongation | 5–9% |
| impact strength | 4–7 kg/cm² |

With hardness of the base metal varying within 170–212 $HB_r$, typical of the deposited metal is the Brinell hardness number of 180–210 $HB_r$ and of the transition zone, 210–230 $HB_r$. The above hardness number makes possible easy processing of the deposited metal with any tool available.

What is claimed is:

1. A flux-cored electrode for welding and surfacing cast iron which comprises a steel casing and a pulverized charge incorporated in the casing; said steel casing amounting to 65–80 percent by weight of total weight of the flux-cored electrode and said pulverized mixture containing the following ingredients taken in percent by weight of the total electrode weight:

| | |
|---|---|
| graphite | 5–12 |
| ferrosilicon | 0.1–6.0 |
| iron powder | 0.01–20.00 |
| complex modifier | 0.5–6.0 |
| flux-forming agent | 0.1–3.0 | said complex modifier being an alloy having the following composition in percent by weight:

| | |
|---|---|
| magnesium | 1–12 |
| rare-earth metals | 0.1–10.0 |

-Continued

| | |
|---|---|
| calcium | 8–22 |
| silicon | 50–65 |
| iron | 8–20 | wherein said flux-forming agent comprises halides of alkaline earth metals taken individually or in combination.

2. A flux-cored electrode as in claim 1 which contains fluorspar as a flux-forming agent, containing over 85 percent of calcium fluoride and amounting to 0.3–2.5 percent by weight of the total weight of the electrode.

* * * * *